United States Patent [19]

Miller

[11] 4,065,513

[45] Dec. 27, 1977

[54] PROCESS FOR REMOVING ACETYLENE FROM HYDROGEN CHLORIDE GAS

[75] Inventor: Richard H. Miller, Sulphur, La.

[73] Assignee: PPG Industries, Inc., Pittsburgh, Pa.

[21] Appl. No.: 677,465

[22] Filed: Apr. 15, 1976

[51] Int. Cl.² .................. C01B 7/08; C07C 21/06
[52] U.S. Cl. .................. 260/656 R; 423/481; 423/488
[58] Field of Search .................. 423/488, 481; 260/656 R

[56] References Cited

U.S. PATENT DOCUMENTS 3,923,963  12/1975  Rideout et al. .................. 423/488 X
3,979,502  9/1976  Correia et al. .................. 423/488

OTHER PUBLICATIONS

"Encyclopedia of Chem. Technology" by R. E. Kirk and D. F. Othmer, vol. 1, 2nd Ed., p. 101, "A to Anthrimides," The Interscience Encyc., Inc., N.Y.

*Primary Examiner*—Edward Stern
*Attorney, Agent, or Firm*—Irwin M. Stein; Roger S. Benjamin; William M. Dooley

[57] ABSTRACT

By-product hydrogen chloride obtained from cracking of 1,2-dichloroethane is purified of minor concentrations of acetylene by contact with activated carbon at a temperature of at least 375° F. (190.6° C.).

9 Claims, No Drawings

PROCESS FOR REMOVING ACETYLENE FROM HYDROGEN CHLORIDE GAS

BACKGROUND OF THE INVENTION

Vinyl chloride is industrially produced by reactions represented by the following chemical equations (see, INDUSTRIAL CHEMICALS, 2'd. Ed. Faith, W. L.; Keyes, D. B. & Clark, R. L.; John Wiley & Sons Inc., Publ. New York 1957; pages 798-800):

1. The reaction of acetylene and hydrogen chloride

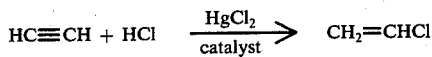

2 The dehydrochlorination of dichloroethane

Hydrogen chloride and acetylene are low molecular weight compounds usually copresent in the uncondensed overhead output stream of processes employing both reactions (1) or (2). Minor concentrations of acetylene are formed in the dichloroethane dehydrochlorination process and accumulate in the fractionated hydrogen chloride by-product stream (typically, at acetylene concentrations between 200 to 4,000 p.p.m. by weight).

Removal of organic impurities from the vapor phase by use of solid adsorbants is favored by low or moderate temperatures (within 50° C. of ambient) which encourage condensation of the adsorbate. Periodically, the adsorvant bed must be disconnected from the vapor phase input for replacement of spent adsorbant or desorption of accumulated adsorbate. In particular, activated carbon adsorbants generally adsorb non-polar and chlorinated hydrocarbons in preference to unsaturated hydrocarbons such as ethylene or acetylene.

U.S. Pat. No. 2,255,752 (issued September 16, 1941 to G. Basel and E. Schaeffer) describes hydrogen chloride as an inert diluting gas suitable for use in admixture with acetylene (and chlorine) in the presence of porous charcoal at temperatures of 300° to 400° C.

U.S. Pat. No. 2,474,206 (issued June 28, 1949 to W. de Nie) describes the catalytic combination of hydrogen chloride and acetylene over an adsorptive substrate (such as activated carbon) impregnated with a mercury catalyst at temperatures above 100° C.

Hydrochlorination catalysts require additional process steps to be fixed on suitable supports. In addition, mercuric chloride catalyst sublimes without decomposition at elevated temperatures and is capable of migrating off of a porous carbon substrate.

Hydrogen chloride has enhanced value if it is purified by removal of acetylene. It is desirable to develop a method of easily removing minor concentrations of acetylene from a hydrogen chloride gas stream.

THE INVENTION

This invention is a process for reducing the acetylene content of a hydrogen chloride gas stream. Moreover, this invention is an improved process of dehydrochlorinating dichloroethane to form vinyl chloride and purified by-product hydrogen chloride. By-product hydrogen chloride containing low concentrations of acetylene is purified (i.e., reduced in acetylene content to below 50 p.p.m. by weight) by contact with activated carbon at temperatures of at least 375° F. (190.6° C.).

Surprisingly, it has been discovered that acetylene contained at low concentrations in gaseous hydrogen chloride will rapidly and easily hydrochlorinate in a reaction zone free of hydrochlorination catalyst in the presence of activated carbon if the reaction is conducted in the vapor phase at temperatures in excess of those generally employed for adsorptive applications of activated carbon.

DETAILED DESCRIPTION OF THE INVENTION

The hydrogen chloride vapor phase feed suitable for treatment in the process of this invention may be any gas stream substantially free of water, elemental oxygen and elemental chlorine containing a major porportion of hydrogen chloride and a minor proportion of acetylene. If desired, diluent gases or vapors such as nitrogen or vinyl chloride may be present in the feed stream. The process is particularly well suited to the treatment of hydrogen chloride gas streams which are fractionated by-product of dichloroethane cracking. Such cracked by-product hydrogen chloride streams typically contain 200 to 4,000 p.p.m. by weight of acetylene. Hydrogen chloride streams containing in excess of 4,000 p.p.m. acetylene are suitable feed for the process of this invention but the quantity of reaction products resulting from the hydrochlorination of the contained acetylene may reach troublesome proportions. Hydrogen chloride suitable for applications requiring a low organic content is advantageously prepared by a preliminary removal of high (over 4,000 p.p.m.) acetylene levels .

Hydrogen chloride is "purified" within the meaning of this invention when its acetylene content is reduced to less than 50 p.p.m. by weight.

"Activated carbon" as the term is employed in the process of this invention is any porous carbon substrate derived by controlled heating and devolatilizing of animal, vegetable or mineral sources; for example, bone char, willow or coconut charcoal or bituminous coal. It is preferred that the activated carbon be free of catalytically effective amounts of acetylene hydrochlorination catalysts such as those derived from mercury, antimony or bismuth. Activated carbons having effective surface areas (as determined by $N_2$, BET method) in excess of $250 M^2/gram$ are generally acceptable, and those having surface areas in excess of $900 M^2/gram$ are preferred. Especially preferred are activated carbons derived from bituminous coal designed for use in vapor phase applications having a surface area of $1000-2000 M^2/gram$. Commerical activated carbons of widely varying particle size may be utilized in the practice of this invention. If fixed bed operation is desired, then a relatively coarse size (viz., $4 \times 10$ to $12 \times 30$ Standard Mesh Size) is recommended for efficient flow of the acetylene contaminated hydrogen chloride. Alternately, the activated carbon may contact the hydrogen chloride in the form of a fluidized bed and have a correspondingly smaller particle size. The activated carbon bed may be used to purify a considerable volume of hydrogen chloride since the hydrochlorinating action of the activated carbon is not consumed or exhausted by operation of the process of the invention.

Under normal operating conditions requiring practical hydrochlorination rates, the acetylene contaminated hydrogen chloride is contacted in the vapor phase with activated carbon at a reaction temperature of at least 375° F. (190.6° C.) with a minimum reaction temperature of 395° F. (201.7° C.) being preferred. Practical upper temperature limits are less definite except that excessive temperatures encourage decomposition of the acetylene reaction products and aggravate corrosion and handling problems. It is recommended that reaction temperatures below 700° F. (371° C.) and preferably below 500° F. (260° C.) be employed. Generally, the process is most advantageously operated at temperatures between 395° F. (201.7° C.)and 425° F. (218.3° C.).

The retention time of the acetylene containing hydrogen chloride in a reaction zone with activated carbon can vary over a wide range. Generally, where practical efficiencies are desired less than 75 grams of gaseous hydrogen chloride are passed through a liter of activated carbon bed per minute and the rate may preferably be less than 35 grams of hydrogen chloride per liter of activated carbon per minute. The flow rate of the hydrogen chloride stream in contact with the activated carbon is adjusted so that the retention time of the gaseous hydrogen chloride in the activated carbon bed is sufficient to purify the hydrogen chloride. In general, hydrogen chloride streams containing acetylene concentrations at the low end of the range of 200 to 4,000 p.p.m. may be purified by shorter contact times with activated carbon than hydrogen chloride streams containing acetylene concentrations at the high end of the range. Retention times in excess of nine seconds and more typically in the range of 9 to 30 seconds are suitable for the practice of this invention. If desired, the acetylene removal may be systematically monitored by analytical techniques such as gas chromatography to determine optimum retention time.

The by-products of the acetylene hydrochlorination are vinyl chloride and dichloroethane. These impurities may remain in the acetylene lean (purified) hydrogen chloride streams for applications where their presence is not deleterious or, if separation of the vinyl chloride and dichloroethane is desired, it may be accomplished by fractionation or absorption units of convention design. The removal of these higher molecular weight hydrochlorinated acetylene by-products is accomplished with considerably less difficulty than is the removal of the precursor acetylene impurity.

The acetylene hydrochlorination may be conveniently performed as a continuous process. Since the activated carbon contacted with the hydrogen chloride feed stream does not function as an adsorbant, there is no necessity for routine periodic desorbtion of the carbon bed as is the case in its conventional mode of use.

It is contemplated that for ease of operation a single adsorption bed in a single reactor unit would be most frequently employed, however, it is within the scope of the invention to use multiple carbon beds residing in one or more acetylene hydrochlorination reactor units.

The reactor may be of any convenient configuration provided with an inlet, an outlet and means of adjusting the temperature of the contained activated carbon bed. Construction materials must be those resistant to attack by hydrogen chloride at elevated temperatures, such as nickel or glass.

The activated carbon containing hydrochlorination reactor may be employed at one or more different points in the dichloroethane dehydrochlorination process. The output stream coming directly from the dichloroethane dehydrochlorination reactor has a typical composition of one-third mole fraction each of vinyl chloride, hydrogen chloride and dichloroethane. The hydrochlorination reactor may be coupled to the output stream of the dichloroethane cracking furnace with only the interposition of moderate cooling means sufficient to reduce the stream temperature to the level required for input to the acetylene removal hydrochlorination reactor (viz., above 190.6° C. and below 260° C.). The acetylene purified output may then be further fractionated to obtain unreacted dichloroethane, plus vinyl chloride and hydrogen chloride products.

In another embodiment the acetylene hydrochlorination reactor may be employed at a point where the hydrogen chloride has been cooled to approximately ambient temperatures and fractionated from the dehydrochlorination reactor output. The fractionated hydrogen chloride is thereafter contacted in the vapor phase with activated carbon in manner of the process of this invention.

The entire reaction zone, including the reactor and related apparatus, activated carbon, and feedstock is free of catalytically effective amounts of acetylene hydrochlorination catalyst.

The following Example is illustrative of the practice of the invention.

EXAMPLE

By-product hydrogen chloride obtained by thermal cracking of 1,2-dichloroethane was purified by the following described method and apparatus:

A tubular reactor was formed of a four-inch inside diameter (10.2 cm.) nickel pipe of eight foot (2.44 meter) height. The reactor was steam traced with copper tubing to permit temperature control.

The vertically disposed tubular reactor was charged with ten pounds (4.53 Kg) of 12 × 30 mesh Type BPL Pittsburgh Activated Carbon (12 × 30 mesh) resulting in a bed height of 4 to 5 feet. The activated carbon was supported by a twelve-inch (30.5 cm.) layer of cylindrical ceramic pellets. Reactor pressure was 32 p.s.i.g. (322 KPa). Hydrogen chloride vapor was continuously supplied to the top of the reactor at flow rates between 11 and 22 pounds per hour (5 Kg. to 10 Kg. per hour) for a period in excess of forty-eight hours.

Reactor feed and output were analyzed by gas chromatography on Porapak T ® (porous polymer column packing; trademark of Waters Associates Inc., Milford, Mass.). The hydrogen chloride feed was monitored for elemental chlorine (orthotolidine test - $Cl_2$ detection limit of 0.1 p.p.m.) to assure that acetylene was not being removed by chlorination reactions.

The results of the experiments are set out in the Table below:

TABLE

BY-PRODUCT HYDROGEN CHLORIDE PURIFICATION EXPERIMENTS

| Experiment No. | 1 | 1a | 1b | 1c | 2 | 2a | 2b | 3 | 3a | 3b | 4 | 4a | 4b | 5 | 5a | 5b |
|---|---|---|---|---|---|---|---|---|---|---|---|---|---|---|---|---|
| Time, Hrs. of Operation | 0.3 | 2.0 | 3.2 | 6.2 | 18.8 | 24.8 | 26.3 | 29 | 30 | 32.3 | 35.5 | 38 | 40.5 | 43 | 45 | 48 |
| Reaction Temp. °F. (°C.) | — | 350 (176.7) | 350 (176.7) | 375 (190.6) | — | 395 (201.7) | 400 (204.4) | — | 400 (204.4) | 405 (207.2) | — | 410 (210) | 405 (207.2) | — | 395 (201.7) | 400 (204.4) |
| Reactor Retention Time, Seconds | — | 9 | 9 | 17 | — | 16 | 16 | — | 13.6 | 13.6 | — | 16 | 16 | — | 8.9 | 12 |
| Acetylene p.p.m. | 700 | 201 | 119 | 1 | 802 | 3 | 2 | 882 | 9 | — | 971 | 1 | 1 | 1004 | 96 | 29 |
| Sampling Location | Reactor Feed | Reactor Outlet | Reactor Outlet | Reactor Outlet | Reactor Feed | Reactor Outlet 972 | Reactor Outlet 984 | Reactor Feed | Reactor Outlet 1661 | Reactor Outlet 1762 | Reactor Feed | Reactor Outlet 1653 | Reactor Outlet 2006 | Reactor Feed | Reactor Outlet 1379 | Reactor Outlet 1355 |
| Vinyl Chloride p.p.m. | — | ? | — | — | — | | | — | | | — | | | — | | |
| 1,2-Dichloroethane p.p.m. | — | — | — | — | — | 55 | 154 | — | 155 | 164 | 875 | 793 | 555 | 945 | 1052 | 906 |
| 1,1-Dichloroethane p.p.m. | — | 143 | 170 | 152 | — | 211 | 363 | — | 480 | 508 | 31 | 588 | 459 | — | 297 | 343 |
| Elemental Chlorine | ←——— <10 p.p.m. Cl$_2$ ———→ | | | | | | | | | | | | | | | |

The presence of vinyl chloride in the reactor outlet stream correlates with the reduction of acetylene and indicates that acetylene hydrochlorination has been effected. The experimental results further show that the acetylene content of hydrogen chloride is reduced by contact with activated carbon at temperatures above 350° F. (176.7° C.).

It is to be understood that although the invention has been described with specific references and specific details of embodiments thereof, it is not intended to be so limited since changes and alterations therein may be made which are within the full intended scope of this invention as defined by the appended claims.

I claim:

1. In the thermal dehydrochlorination of dichloroethane to form (1) vinyl chloride and (2) by-product hydrogen chloride substantially free of elemental chlorine wherein said by-product hydrogen chloride contains at least 200 parts per million by weight of acetylene, the improvement which comprises purifying said by-product hydrogen chloride by contacting a vaporous stream of said hydrogen chloride with activated carbon in a reaction zone free of catalytically effective amounts of acetylene hydrochlorination catalyst and added elemental chlorine at a temperature of at least 190.6° C. for a time sufficient to reduce by hydrochlorination the acetylene content thereof below 50 parts per million by weight.

2. The process of claim 1 wherein the by-product hydrogen chloride contains between 200 and 4,000 parts per million by weight of acetylene before contact with the activated carbon.

3. The process of claim 1 wherein the by-product hydrogen chloride is contacted with activated carbon at a temperature between 201.7° and 218.3° C.

4. The process of claim 2 wherein the by-product hydrogen chloride is contacted with activated carbon at temperatures between 395° to 425° F. for a time in excess of 9 seconds.

5. A process for the hydrochlorination of acetylene present in a gaseous stream of hydrogen chloride in amounts of at least 200 parts per million parts by weight of hydrogen chloride, said stream being substantially free of elemental chlorine, which comprises contacting said gaseous stream with activated carbon in a reaction zone free of catalytically effective amounts of acetylene hydrochlorination catalyst and added elemental chlorine at a temperature of at least 190.6° C. for a time sufficient to reduce by hydrochlorination the acetylene content of said stream below 50 parts per million by weight.

6. The process of claim 5 wherein the concentration of acetylene in the hydrogen chloride stream is between 200 and 4,000 parts per million by weight.

7. The process of claim 5 wherein the acetylene containing hydrogen chloride stream is contacted with activated carbon at a temperature between 201.7° and 218.3° C.

8. The process of claim 5 wherein the acetylene containing hydrogen chloride stream is contacted with activated carbon at a rate of less than 75 grams of hydrogen chloride stream per minute per liter activated carbon.

9. The process of claim 6 wherein the hydrogen chloride stream is contacted with activated carbon for in excess of 9 seconds.

* * * * *

UNITED STATES PATENT AND TRADEMARK OFFICE
CERTIFICATE OF CORRECTION

PATENT NO. : 4,065,513
DATED : December 27, 1977
INVENTOR(S) : Richard H. Miller It is certified that error appears in the above-identified patent and that said Letters Patent are hereby corrected as shown below:

Column 8, Claim 4, line 3 "395° to 425°F." should be
--201.7° to 218.3°C--

Signed and Sealed this

Ninth Day of May 1978

[SEAL]

Attest:

RUTH C. MASON
Attesting Officer

LUTRELLE F. PARKER
Acting Commissioner of Patents and Trademarks